United States Patent [19]
Fugere et al.

[11] Patent Number: 5,689,161
[45] Date of Patent: Nov. 18, 1997

[54] MOTION CONTROLLER WITH REMOTE LINKING

[75] Inventors: Michael A. Fugere; David E. Halpert, both of Windsor, Vt.

[73] Assignee: Allen-Bradley Company, Inc., Milwaukee, Wis.

[21] Appl. No.: 763,450

[22] Filed: Dec. 9, 1996

Related U.S. Application Data

[63] Continuation of Ser. No. 523,877, Sep. 6, 1995, which is a continuation of Ser. No. 85,998, Jun. 30, 1993, Pat. No. 5,463,296.

[51] Int. Cl.$^6$ .................................................. G05B 19/10
[52] U.S. Cl. ............................ 318/563; 318/625; 318/49
[58] Field of Search .................................. 318/560–575, 318/625, 41, 49, 52, 85

[56] References Cited

U.S. PATENT DOCUMENTS

| | | | |
|---|---|---|---|
| 4,712,052 | 12/1987 | Omae et al. | 318/625 |
| 4,825,133 | 4/1989 | Tanuma et al. | 318/49 X |
| 5,136,222 | 8/1992 | Yamamoto et al. | 318/568.2 |
| 5,239,247 | 8/1993 | Habig et al. | 318/568.18 |
| 5,248,922 | 9/1993 | Meshkat | 318/560 |
| 5,341,079 | 8/1994 | Matsuura et al. | 318/568.19 X |
| 5,361,260 | 11/1994 | Mito | 318/41 X |
| 5,463,296 | 10/1995 | Fugere et al. | 318/568.2 |

*Primary Examiner*—Brian Sircus
*Attorney, Agent, or Firm*—Keith M. Baxter; John M. Miller; John J. Horn

[57] ABSTRACT

Multiple motion controllers for controlling servo motors are connected by a digital communications link so that controlled axes of the motion controllers may be slaved together regardless of their physical proximity. A given controller broadcasts position or command signals on the communications link in response to a request report message from any other controller. A second request report message may stop the broadcasting to conserve link capacity. Time shifting implicit in the link messages is corrected by estimating the velocity of the master axis and extrapolating the position to the local axes' time of updating.

5 Claims, 3 Drawing Sheets

MOTION CONTROLLER WITH REMOTE LINKING

This is a continuation, of Ser. No. 08/523,877 filed on Sep. 6, 1995, which is a continuation of application Ser. No. 08/085,998 filed Jun. 30, 1993, now U.S. Pat. No. 5,463,296.

FIELD OF THE INVENTION

This invention relates generally to motion controllers for providing real-time control to industrial servo motors and more particularly to a digital communications network for linking multiple real-time motion controllers together.

BACKGROUND ART

Servo motors, including generally motors whose torque, position, or velocity may be controlled in response to a feedback signal, are used widely in industrial processes where control of one of these quantities is critical.

In application, a servo motor is typically associated with a sensor for providing a feedback signal for the controlled quantity. For both position and velocity control, the sensor is a position sensor sensing angular position, for example, a resolver providing phased sinusoidal outputs depending on the angle of its input shaft, or a rotary encoder providing either a digital word indicating absolute angular position or a series of pulses indicating incremental motion and direction.

The servo motor is typically driven by a motor amplifier which provides power for driving the motor. For a DC servo motor, the servo amplifier will typically be a high powered DC amplifier. More complex motor amplifiers are used for driving brushless AC motors and the like where commutation of the current flow in the windings is required. Amplifiers which provide commutation require a position feedback signal from the position sensor.

While some motor amplifiers may be programmed to provide rudimentary higher level control of the motor, such as setting limits of output speed, velocity or torque, ordinarily more complex control of the motor motion is done by a motion controller. The motion controller incorporates specialized hardware dedicated to real time motor control in response to signals from the position sensor. For example, the motion controller may implement a well known proportional/integral/derivative ("PID") type control loop.

The motion controllers typically also include a general purpose computer which may be programmed to provide a series of useful control functions. For example, a motion controller may include a function to control the velocity profile of the motor motion between the two positions. Typical profiles may be trapezoidal where the velocity ramps linearly up or down at the beginning and end of the motion, or may be "S curve" or "parabolic" where the straight ramps are replaced by curved profile shapes having constrained higher derivatives.

Motion controllers can enable or disable types of feedback during the control of the motor and importantly may execute conditional instructions akin to those used in programming conventional digital computers which allow the control parameters used by the motion controller to change depending on a history of previous external inputs.

Although some of the function provided by motion controllers overlap those which could be performed by a centralized industrial controller, the motion controller, unlike the centralized controller may be positioned in physical proximity to the motors being controlled and may execute high speed control tasks on a real-time basis. High speed real-time control is necessary for precise and reliable control of high speed servo systems.

Frequently in a multiple motor control application, it will be desired that one or more motors be operated in a manner that simulates a direct mechanical connection between the two motors either by a straight shaft, a gear box or a cam. This virtual connection is effected by employing a single position signal received by the motion controller to control multiple motors connected to that motion controller.

Such virtual links are most valuable when the relative position of the motors is such that an actual physical link would be impractical, for example, when the motors are separated by a considerable distance. In such situations, wires must be run from the output of the controller to the remote motor amplifier, or between a single encoder and multiple motion controllers near the two motors. Such a procedure involves a significant expense in wiring and is relatively inflexible. If the motion control program is to be changed, the encoders must be rewired.

SUMMARY OF THE INVENTION

The present invention provides a digital communications network for motion controllers which allows the motors on each controller to be arbitrarily controlled by any other motion controller. Generally the source of the control on a first motion controller will be termed a "master axis" and the controlled motor on a second motion controller will be termed a "slave axis". Such control includes "gearing": the locking of the two axes together as if connected by a shaft or gear box or "camming": the control of the position of two axes as if connected by a set of cams. Because each motion controller may control several motors, "axis" refers both to the particular motion controller and the particular motor on that motion controller Specifically, a motion controller has an input, for receiving at least one shaft sensor, and a control means, responsive to position signals received from the shaft sensor, for providing motor commands to control the position of the motor. Further, the motion controller is connected to a communications link through a link transceiver to receive and transmit messages on that link. A message decoder communicating with the link transceiver detects a position report command message and instructs a message generator, upon the receipt of this message, to periodically transmit a position message on the link indicating motion of the motor shaft. The position message may be the position signal from the shaft sensor or the motor command output from the control means.

It is one object of the invention to provide a flexible interlinking of axes at different motion controllers through an industrial communications link. Upon receipt of the position report command message, a given master axis begins broadcasting position signals, for example, the output from one shaft sensor. These position signals may be received by any number of other slave axes and used to control their motors to that signal. The use of a position report command message to initiate such transmission allows only certain selected master axes to transmit information, thus decreasing the required communications link capacity, and also allows flexible reconnecting of the various virtual links among the motion controllers, through a software command without physical rewiring of the motion controllers. The motion controllers may arbitrarily change the masters by commands sent along the link and a single motion controller may have both master and slave axes.

The position message may include a numerical axis address indicating the source of the position information.

It is another object of the invention to allow a single position message to be broadcast by a master axis and received by and used for linkage by multiple other slave axes without proportionally increasing the message traffic on the link. Thus real-time linkage over an industrial communications link is viable.

At the time each position message is received, a local clock in slave motion controller may be read. From this position message, the velocity of the master axis may be estimated. Immediately prior to updating the command signals to the motor of the slave axis, the local clock may be again read and the time difference indicated by the two readings of the local clock and the estimated velocity used to adjust the position signal. This updated command signal is used to provide command signals to the motor of the slave axis. The velocity may be estimated by a time value appended to the position message by the master axis, the absolute time value having no relation to the clocks on the slave axis but their difference indicating the period between messages.

Thus, it is another object of the invention to permit a low speed, asynchronous industrial communication link to be used to connect remote motion controllers on a real-time basis. The time correction of the transmitted position signals permits selected portions of this real-time control to be distributed over several motion controllers without unacceptable loss of control speed.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

DETAILED DESCRIPTION OF THE PREFERRED EMBODIMENT

Figure 1:
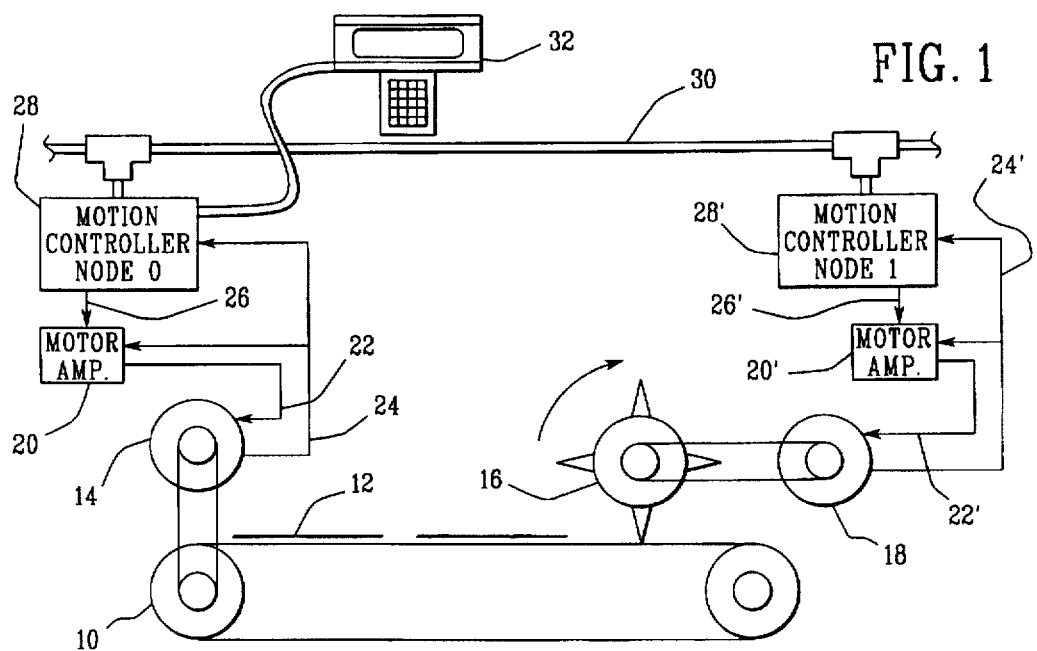
FIG. 1 is a pictorial representation of an example sheet slitting system having a conveyor belt motor and a knife motor each controlled by a motion controller connected together via a link according to the present invention.

Referring to FIG. 1, an example industrial process includes a conveyor belt 10 for transporting a sheet material 12 along its upper surface with rotation of the belt by a motor 14 so that the sheet material moves past a knife wheel 16 rotated by motor 18. In this process, in order that the knives of the knife wheel 16 cut the surface of the sheets in the proper position, it is important that the knife wheel 16 move in synchrony with the motion of the sheet material 12 on the conveyor belt 10. Accordingly, knife wheel motor 18 is slaved to the motion of the conveyor motor 14.

A first axis of conveyor motor 14 is driven by a motor amplifier 20 which is specific to the type of motor 14 and may be simply a high powered DC amplifier if motor 14 is a DC motor or an amplifier with commutating ability if motor 14 is a brushless AC motor. Generally, the motor amplifier 20 provides winding power 22 to the motor 14 and receives a position signal 24 which may also be received by the motor amplifier 20 for commutating purposes. A suitable motor 14 and motor amplifier 20 is sold by Allen Bradley, the assignee of the present application, under the designation 1386DS motor and 1386/1326DS DC Servo Drive System. The position signal 24 is generally from a rotary encoder or resolver (not shown) which is typically attached directly to the motor shaft to reduce the effects of mechanical windup.

The motor amplifier 20 receives command signals 26 from a motion controller 28. As described above, the motion controller 28 provides more complex functional control of the motor according to a stored program within the motion controller 28. Generally the more complex functional control requires receipt of the position signals 24 which are used for feedback control of the motor 14.

Likewise a second axis of motor 18 driving the knife wheel 16 receives winding currents 22' from a motor amplifier 20' and provides position signals 24' to the motor amplifier 20' and a motion controller 28'. The motion controller 28', in turn, provides command signals 26' to the motor amplifier 20'.

Figure 2:
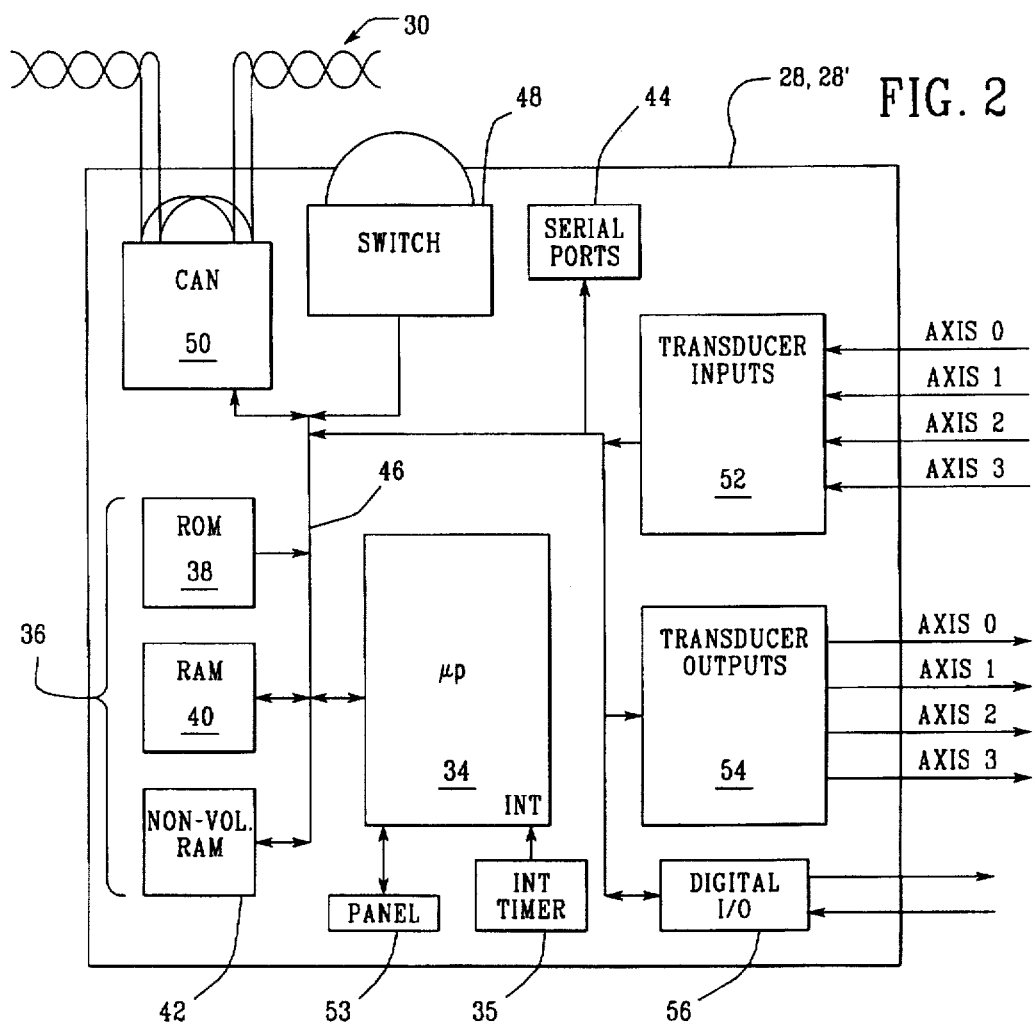
FIG. 2 is a block diagram of the functional elements of the motion controllers of FIG. 1 including a processor for providing command outputs to a controlled motor at an update rate.

Referring now to FIGS. 1 and 2, each motion controller 28 and 28' also may be connected to a programming terminal 32 via one of two serial ports 44 to receive a user program which determines the control of motors 14 or 18. The serial port 44 is connected to an internal bus 46 communicating with a motion control microprocessor 34 and memory 36, the latter which stores the user program from the programming terminal 32. The microprocessor may be, for example, an 80960SB Motion Control Microprocessor manufactured by the Intel Corporation having offices in Santa Clara, Calif. External to the microprocessor 34 is an interrupt timer which may programmably interrupt the microprocessor at regular update intervals for updating the command signals 26 and 26' to the motor amplifiers 20 and 20'

The memory 36 includes read-only memory ("ROM") 38, holding programs for a set of standard programming functions; random access memory ("RAM") 40, serving as a scratch pad memory for the calculations of the microprocessor 34, and nonvolatile RAM 42 used for holding a user program received from the programming terminal 32 and various user defined constants as may be entered by programming terminal 32.

Also connected to the microprocessor 34 are input and output interfaces 52, 54 and 56. Input interface 52 receives and decodes position signals 24 or 24' such as those from resolvers or encoders as may provide an indication of the position of the controlled motor 14 or 18. The position signals are optically isolated from the circuitry of the motion controller 28 as is generally understood in the art. Output interface 54 provides analog outputs via multiple 16-bit analog to digital converters to associated motor amplifiers 20 or 20'. The analog signals are isolated by isolation amplifiers according to well known techniques. Digital I/O interface 56 provides certain twelve binary inputs and twelve binary outputs for ancillary control functions as may be controlled by the program running in the motion controller 28, 28'. The outputs may switch on or off other devices associated with the controlled process, and thus perform some of the tasks traditionally allocated to an industrial controller, while the inputs may provide signals from external switches and the like, upon which the control of the motors 14 and 16 may be made conditional. As will be described, even the status of a certain axis as master or slave may be conditional, for example, and dependent on the state of one of these inputs.

Panel controls 53 including status indicator lamps and a reset switch communicate directly with the microprocessor 34 through dedicated ports. One lamp of the panel controls 53 reflects the state of a watchdog timer (not shown) which must be periodically polled by the microprocessor 34 to indicate that the system is functioning properly.

Importantly, the motion controllers 28 and 28' are connected in parallel on a shared communications link 30. Link 30 is connected in daisy chain fashion so that messages may be monitored and transmitted by the motion controllers 28 or 28' without interruption of communication along the entire length of link 30.

In order to facilitate communications along the shared communications link 30, each motion controller 28 has an address on the link 30, termed a "node number", as may be programmed by the user and used to designate the source or recipient of the particular digital message. Motion controller 28, for example, may be assigned to node zero and motion controller 28' assigned to node one. A rotary switch 48, connected to the bus 46 and having an exposed actuator, is used for the programming of a node number to the motion controller 28 and allows the input of a integer from zero to 7 as may be held in three binary digits. The particular node address of the motion controller is arbitrary and generally multiple motion controllers may be connected to the link 30 subject only to the restraint that their node number be unique.

Communications on the link 30 are managed by a controller area network ("CAN") controller 50 which executes the necessary protocols for the transmission and receipt of messages on link 30 and provides received messages to and receives messages to be transmitted from the microprocessor 34 via bus 46. The CAN controller may be, for example, an 80C592 microcontroller preprogrammed for executing the CAN protocols such as is manufactured by Signetics Corporation having offices in Sunnyvale, Calif.

The CAN specification defines the algorithms and requirements which comprise the Media Access Control (MAC) and physical signaling layers of the ISO/OSI 7-Layer Model for Data Communication Networks. The CAN protocols are specified in ISO document ISO/TC22/ SC3/WG1 as authored by Robert Bosch GmbH. Generally the CAN standard allows for the communication of asynchronous digital messages along a twisted pair of conductors such as may comprise link 30 at speeds of up to 1 Mbit/sec. The CAN protocol specifies a zero to eight byte data message including an eleven bit arbitration field which determines priority when two nodes need to transmits messages at the same time.

The link controller 50 includes an internal buffer memory (not shown) that may be directly addressed by the microprocessor 34. Each location of the buffer may be loaded with an arbitration field for use in sending and receiving messages, and, in the case of messages to be sent, with message data. The link controller 50 automatically transmits the message when the link 30 is free according to the priority of its arbitration field and then signals the microprocessor 34 when the message has been transmitted. For messages being received, when a message arrives, it is compared against the arbitration fields of each buffer location and the first location with the same arbitration field receives the message. At the time of receipt, the microprocessor 34 is signaled that a message has arrived, and as will be described, executes an interrupt routine to associate the received message with an arrival time as indicated by a "slave time stamp" related to the value of an internal software clock.

Each motion controller 28 or 28' may receive six different types of "request-type" messages and may transmit six different types of "report-type" messages in response to corresponding request-type messages received by that motion controller 28 or 28'. Generally, each message has a different arbitration field, which may include addresses of the transmitting or receiving motion controller 28', and includes one or more following data bytes. The request-type and report-type messages and their arbitration fields are provided in Table I.

TABLE I

| Name | Arbitration Field | Message |
|---|---|---|
| Request-Type Messages | | |
| 1. Request Report Actual Position | 10000SSSRRR | Address of axis to report |
| 2. Request Report Command Position | 10001SSSRRR | Address of axis to report |
| 3. Request Report Flags | 10010SSSRRR | Start or stop sending flags |
| 4. Request Report Value | 10011SSSRRR | Axis number and parameter/variable number identification |
| 5. Request Home Position Report | 10100SSSRRR | Address of axis to report |
| 6. Request Registration Position Report | 10101SSSRRR | Address of axis to report |
| Report-Type Messages | | |
| 7. Axis Actual Position Report | 00000XXXSSS | Master transmission time and new axis position report |
| 8. Axis Command Position Report | 00001XXXSSS | Master transmission time and controller commanded axis position |
| 9. Flag Report | 0001000SSS | Flag values |
| 10. Value Report | 00011000RRR | Requested value |
| 11. Axis Home Position Report | 00100XXXSSS | Master transmission time, new axis position, position offset from marker pulse |
| 12. Axis Registration Position Report | 00101XXXSSS | Master report time, new axis position, position offset from registration pulse occurrence |

SSS is the address of the sending node, RRR is the address of the receiving node, XXX is the address of the axis within the designated node.

Request messages, which may be sent by any node, are requests to other nodes (motion controllers 28 or 28') for particular information. The Request Report Actual Position message requests continuous broadcasts of position signals 24 or 24' from the designated motion controller 28 and is responded to by the Actual Axis Position Report message providing that information. The Axis Actual Position Report message includes a "master time stamp" from the sending, master node according to the local clock of the master node. This master clock is typically unrelated to the clock values of the slave nodes in the asynchronous communication system of link 30 in the preferred embodiment. As will be described below, the master time stamp is employed in calculating the instantaneous velocity of the master axis and used to correct for clock speed and phase differences between the various axes.

Alternatively, the Request Report Command Position message may be sent and responded to by the Axis Command Position Report message in which case the responding motion controller 28 provides the command signals 26 or 26' indicating the motion controller's command to its associated motor amplifier 20. Use of command position rather than actual position may be desirable so as to provide improved response time for the slave axis. The Axis Command Position Report message includes a master time stamp similar to that described for the axis actual position report.

The Request Report Flags and Request Report Values messages are responded to by the Flag Report and Value Report messages and provide a means for exchanging one bit flags or multiple bit value data between controllers 28 such as may be necessary to coordinate the various controllers programs. The flags, for instance, could represent digital I/O values received by the digital I/O interface 56 of one motion controller and required for other axes on the link. The flags provide a means of synchronizing control of applications programs running on different motion controllers 28 or 28'. For example, one axis may be programmed to wait for a second axis to complete a given control task as indicated by the changing of a flag value transmitted by the second axis. Importantly, because of the present invention's ability to accommodate some time disturbance in the transmission of real-time position and command messages, used for synchronizing the motors 14 and 18 on different motion controllers 28 and 28', the same link 30 used for these real-time position and command messages can also be used for communications of these flag messages. Generally, the status of any flag for which a report is requested is transmitted immediately when the state of the flag changes and periodically thereafter.

Values differ from flags in that they are generally used to hold multi-bit variables and parameters defining the control algorithms employed by a given axis. Values may be advantageously transmitted between motion controllers 28 and 28' to permit one axis to effectively "reprogram" the others to conform to its control strategy. Although a given axis is prohibited from "writing" its values to another axis (to avoid the risk of interfering with the ongoing control at the other axis) the values may be broadcast on the link 30 and the receiving axis programmed to read and use the broadcast values. Like the flags, transmission of values may be done on the same link 30 without significantly affecting the transmission of the real time axis information of the position and command messages.

The Request Home Position message provides a means of synchronizing multiple axes to the home position of the master axis. The home position represents a unique location of the position sensor and hence of motor 14 or 18. The Request Home Position Report message invokes an Axis Home Position Report message which provides information as to the present axis position, the offset between that position and the home position, and a local clock value indicating when the position was measured. This local clock value has no relationship to the clock values of the various slave axes and thus cannot be used to accommodate directly for transmission delays. As will be described below, however, the local clock value is used indirectly in a time disturbance correction routine that permits real-time coordination of the axis over the link 30.

Similar to the Request Home Position Report message is the Request Registration Position Report message which invokes a Registration Position Report message. The Registration Position Report message and the Home Position Report message differ primarily in that the Home Position Report message responds to a motor position whereas the Registration Position Report message responds to the portion of an object moved by the motor as detected by an external sensor and possibly unrelated to a unique motor position. For example, the home position typically occurs with every rotation of an encoder whereas a registration position indicating the position of the sheet material 12 on the conveyor belt 10 of FIG. 1, may occur only once in many encoder rotations.

If multiple duplicate request-type messages are received from different slave axes, only a single report-type message is generated and broadcast on the link, however, the multiple requesting nodes are recorded. A single report-type message suffices to satisfy multiple request-type messages because each response to a request is broadcast to all nodes on the link 30.

Figure 3:
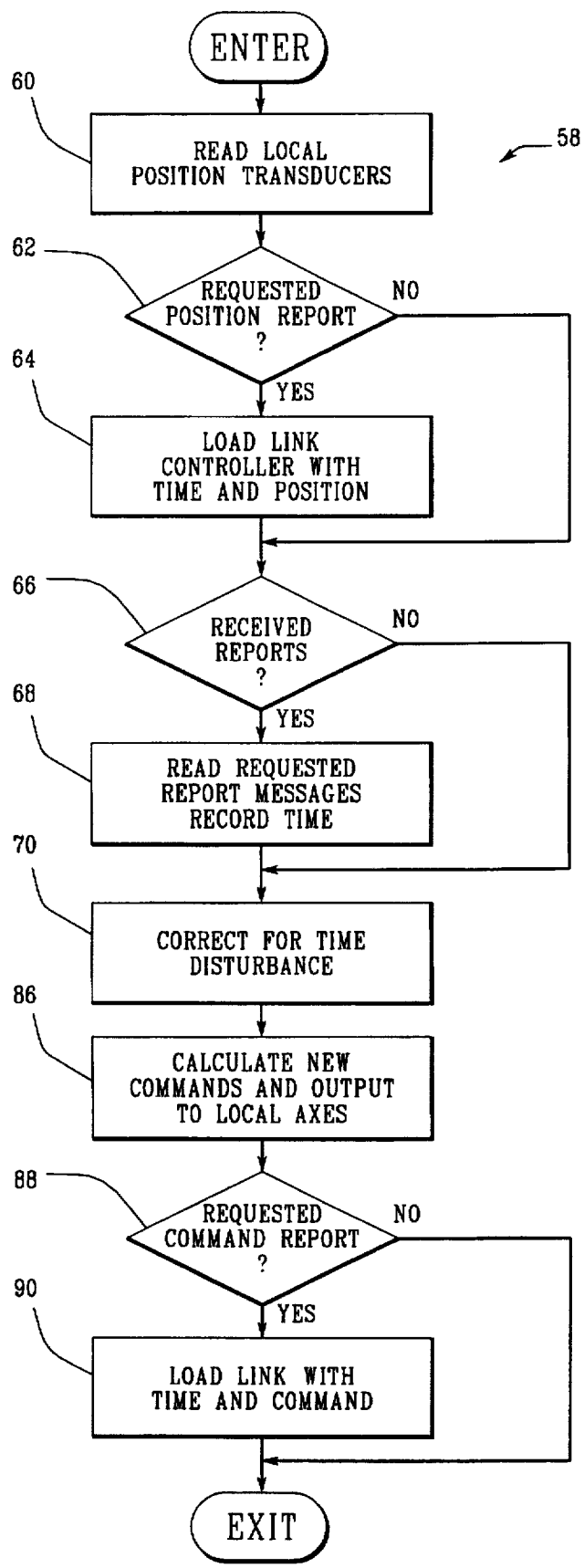
FIG. 3 is a flow chart of an update routine executed by the processor of FIG. 2 during each update and including a time disturbance correction routine.

Referring now to FIGS. 2 and 3, microprocessor 34 executes a user defined control program stored in ROM 38 in normal sequential fashion, but, this program is periodically interrupted at times "TT" by external interrupt timer 35 to begin execution of an interrupt routine 58 to update the command signals 26 and 26' and to provide responses to request-type messages for position or command data which have real-time significance.

At the beginning of the interrupt routine 58, the local position transducers for each axis are read and indicated by process block 60. The local axis are those having motors 14 and 18 and receiving position signals 24 or 24' directly at interfaces 54 or 52. Thus, this reading accomplished by interrogation of the transducer inputs at input interface 52 and requires storing of their current positions in RAM 40. Depending on the transducer type, this determination of current position may require the adding of an incremental position received through transducer input interface 52 to a stored value.

At decision block 62, it is determined whether any other axis has requested this axis to transmit an Axis Actual Position Report message. If so, at process block 64, the link controller 50 is loaded with the necessary position signals 24 as obtained in process block 60 together with a current clock value from microprocessor 34. As noted above, generally, this clock value will have no relationship to comparable clock timer values in other motion controllers 28 but provides useful information in extrapolating current position information as will be described. The clock value will be termed "TS" referring to the sampling time of the position.

The link controller 50 transmits the data of the Axis Actual Position Report message on the link independently of the operation of the microprocessor 34 shortly after the information has been loaded into the link controller 50. Upon completion of the loading of the link controller 50 at process block 64 or if there was no requested Axis Actual Position Report message at decision block 62, the program proceeds to decision block 66 and checks the link controller 50 to see if any Axis Actual Position Report or Axis Command Position Report messages have been received. If so, at process block 68, the information from these reports are read and the time at which the reports were received by the link controller 50 is read into a variable "TR" referring to time received.

Typically, the execution of the interrupt routines 58 updating the control of the motors 14 and 18 on two different motion controllers 28 will not be operating at the same phase or necessarily at the same frequency. Further, there is a time delay implicit in transmitting data on the link 30 so that the time TR will normally be some time in the past and not coincident with the times TI of the interrupt routine 58 of these process blocks. Accordingly, it is necessary to determine an effective position or command for the instant TI that the interrupt routine 58 is being executed.

Figure 4:
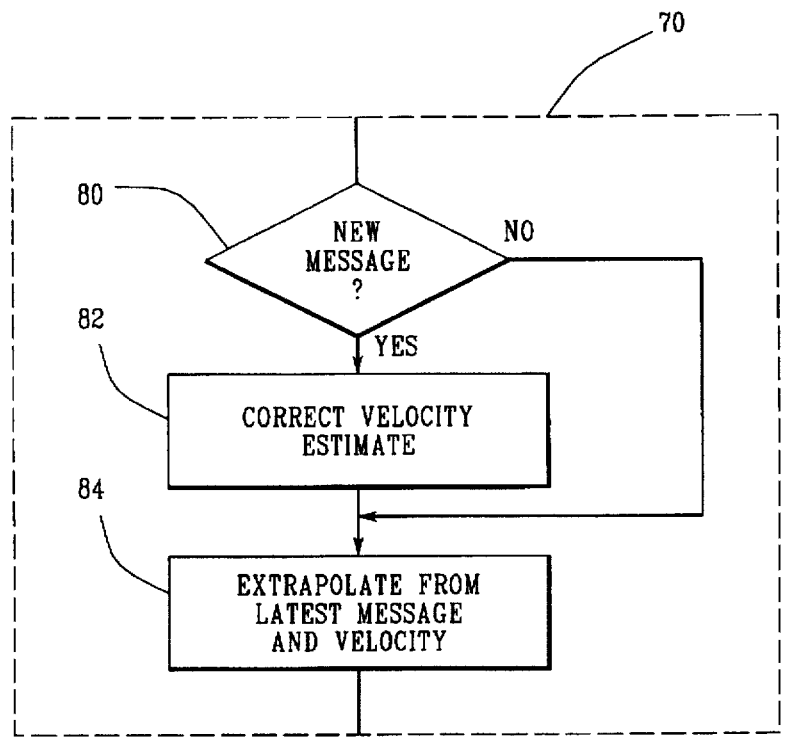
FIG. 4 is a flow chart of the time disturbance correction routine of FIG. 3.
Figure 5:
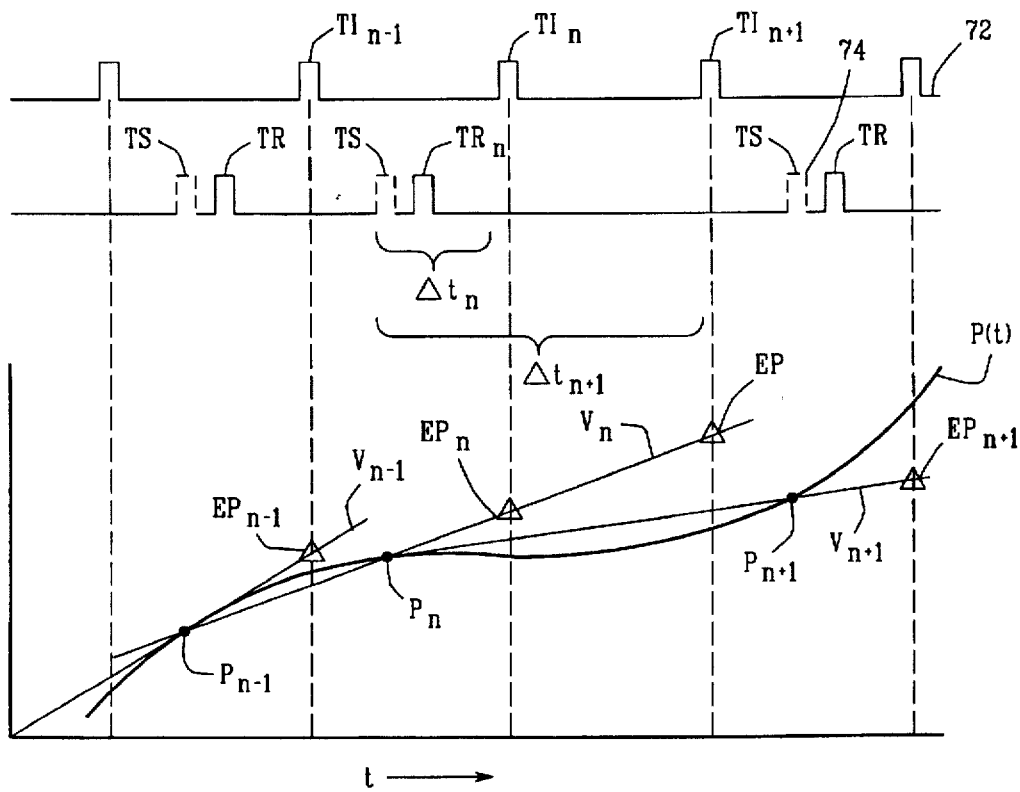
FIG. 5 is a plot of update intervals over time for a slave axis superimposed on a plot of position message receipt times for a master axis according to the present invention, both superimposed on a plot of actual position of the master axis demonstrating the time disturbance correction routine of FIG. 4.

This is performed by the time disturbance correction routine of process block 70. Referring now also to FIGS. 4, and 5, the time disturbance correction routine assumes that the master axis, reporting position or command information, will have axis motion according to function of time P(t) that has a limited rate of change dictated by the effective mass of the motor 14 or 16 and the driven equipment 10 and 16 and the finite power of the motor 14 and 16, so that P(t) will change slowly and typically much slower than the rate of repeated execution of the interrupt routine 58. The motion P(t) as shown in FIG. 5 is therefore much exaggerated from what might be expected.

The interval before a given interrupt $TI_n$ and after which a message is received $TR_n$, is referred to as At and comprises two components, the first $\Delta t_{sync}$ is a result of the lack of synchronization between the clock in the master and slave motion controllers 28 and 28', and the second $\Delta t_{delay}$ is a result of link induced delay times. The latter quantity, $\Delta t_{delay}$, is assumed to be equal to an average link delay $\Delta t_O$ which allows the former quantity to be readily determined by the receipt time $TR_n$ of the message (indicated by the slave time stamp). That is, the actual sampling time $TS_n$ of the report from the master motion 28' will simply be:

$$TS_n = TR_n - T_O \qquad (1)$$

Again, $TS_n$ provides the actual time which the master motion 28 measured its position or command signal and is not generally coincident with the TI, the time at which the position data is required for the generation of the command report based on that data by the interrupt routine 58. Accordingly, a value of the position signal P(t) at $TI_n$ will be extrapolated by use of an estimated velocity of the master axis $$\frac{d(P(t))}{dt}.$$

Referring to FIG. 4, the first step in the time disturbance correction routine, indicated by process block 80, is the determination of whether a new report-type message, either position or command, has arrived since the last execution of the time disturbance correction routine 70. As described above, each arriving position or command message includes a master time stamp of the transmitting master motion controller 28. The value of the master time stamp will, in general, be unrelated to the value of the local clock of the slave axis 28' and will be generally unrelated to the slave time stamp, i.e., the receipt time of the message TR.

If a command or position message has arrived, the master time stamp of this message is subtracted from the master time stamp of the previous message to determine the elapsed time between which the reports were generated. Likewise, the difference between those two reported positions or commands is determined and the ratio is used to develop the average velocity V since the last message. For the first time process block 70 is executed, the average velocity V will be assumed to be zero.

Thus, for two reported positions $P_{n-1}$ and $P_n$, the time difference between the position may be deduced from the master time stamps on the message and a velocity $V_n$ obtained. This correction of the velocity estimate is ongoing and represented by process block 82.

If there is no new message and hence velocity V may not be updated or if there is a new message and after the velocity V has been updated, the time disturbance correction routine proceeds to process block 84 and a current value of the position $EP_n$ for $TI_n$ is extrapolated from the latest position message received $P_n$, the velocity estimate $V_n$, and the difference $\Delta t_n$ between the calculated time of $TS_n$ and the current interrupt time $TI_n$. Specifically for any given interrupt interval $TI_n$:

$$EP_n = P_n + V_n \Delta t_n \qquad (2)$$

Thus for a given message providing a position value of $P_n$ an estimated position value $EP_n$ may be deduced by employing a velocity $V_n$. Any slow drift between the clock rates of the master motion 28 and the slave motion controller 28' is accounted for by the changing in the receipt times TR (as indicated by the slave time stamp) of the messages. If a message wholly fails to be received by the slave motion controller 28, the time disturbance correction routine 70 continues to correct based on the last estimated velocity V until four missing pulses have occurred at which time an error signal is developed.

Referring again to FIG. 3, once the time disturbance of the received report-type messages has been corrected, the local position signals 24 and the remote position signals 24' or remote command signals 26 are employed in process block 86 to calculate new command signals 26' for the slave motion controller 28'. If slave motion controller 28' has received a Request Report Command Position message, as determined by decision block 88, then at this time the link controller 50 is loaded with a time and an Axis Command Report message as indicated by process block 90 and the link controller 50 transmits those messages.

In any case, the interrupt routine 58 then exits to return to the primary user defined program which may control the generation of flag reports or value reports.

Referring again to the example of FIG. 1, during initialization of the controllers 28 and 28', slave motion controller 28' sends to master motion 28, based on the user defined program of slave motion controller 28, a Request Report Actual Position message addressed to node 0 of motion controller 28. At that time, motion controller 28 provides continuous reporting of its position signals 24 allowing node 1 (motion controller 28') to lock motor 18 in synchrony with motor 14 as if they were connected by a solid shaft. Alternatively, in a different application, the relationship between the axes need not be that of a 1:1 ratio but any functional relationship between their positions may be provided by an appropriate calculation within the motion controllers 28. Frequently the ratio of their motions will be controlled to be a constant value or a cam function will be designed mimicking the operation of a cam connecting the two axes.

The ability to connect and disconnect the motion controllers 28 and 28' together for the purpose of linking of their axes, by means of a software command transmitted over an asynchronous link 30 permits the motion controllers 28 and 28' to be flexibly reconfigured as is required for some processes where at certain time master axes revert to slave axes. The ability to turn off and on the reporting prevents saturation of the digital link 30 as would occur if all axes were required to provide real-time reporting of their positions on the link 30 at all times, and thus makes practical the use of a digital link as an effective axis connection.

Critical to the use of an asynchronous digital link 30 and asynchronous operation of separate motion controllers 28 and 28' is the time disturbance correction routine which permits accurate real-time control to be fashioned from periodic asynchronous messages.

While this invention has been described with reference to particular embodiments and examples, other modifications and variations, such as application to projection reconstruction imaging techniques, will occur to those skilled in the art in view of the above teachings. For example, the use of a particular link protocol is not mandated. Accordingly, the present invention is not limited to the preferred embodiment described herein, but is instead defined in the following claims.

We claim:

1. A motion controller operating in conjunction with a servo motor unit having a shaft, the motor receiving motor commands from the motion controller controlling a motion of the shaft, a shaft sensor providing a position signal indicating the position of the motor shaft, and an asynchronous link for communicating messages including axis position report messages, the motion controller comprising:

a position signal input for receiving the position signal from the shaft sensor;

a control means responsive to the received position signal for providing the motor commands controlling the motion of the motor shaft, the control means having a local clock for time stamping the axis position report messages received over the asynchronous link;

an asynchronous link transceiver for receiving and transmitting messages on the asynchronous link;

an address generator for producing a numerical address uniquely identifying the position signal input and the motion controller; and a message generator communicating with the asynchronous link transceiver and address generator for periodically transmitting the position signal.

2. A motion controller operating in conjunction with a servo motor unit, the latter having a shaft, the motor receiving motor commands from the motion controller controlling a motion of the shaft, a shaft sensor which may provide a position of the motor shaft, and an asynchronous link for communicating messages including axis position report messages, the motion controller comprising:

a control means responsive to the received position signal for providing the motor commands controlling the motion of the motor shaft;

a position signal input for receiving the position signals from the shaft sensor;

a control means responsive to the received position signal for providing the motor commands controlling the motion of the motor shaft, the control means having a local clock for time stamping the axis report messages received over the asynchronous link;

an asynchronous link transceiver for receiving and transmitting messages on the asynchronous link;

a message decoder communicating with the asynchronous link transceiver for detecting a request report position message; and a message generator communicating with the asynchronous link transceiver and message decoder for periodically transmitting the position signal only in response to the detected request report position message.

3. The motion controller of claim 2 wherein the message generator, in response to the request report position message, periodically transmits the position signal.

4. The motion controller of claim 2 including also:

an address means for assigning the position sensor with a numerical axis address; and wherein the message transmitted by the message generator includes the numerical axis address.

5. A motion controller operating in conjunction with a servo motor unit, the motor having a shaft, the motor receiving motor commands from the motion controller controlling a motion of the shaft, a shaft sensor which may provide a first position signal indicating a position of the motor shaft, and an asynchronous link for communicating messages including axis position report messages the motion controller comprising:

a position signal input for receiving the first position signal from the shaft sensor;

an asynchronous link transceiver for receiving and transmitting messages on the asynchronous link;

an address means for assigning the shaft sensor with a first predetermined axis address;

a message decoder communicating with the asynchronous link transceiver for detecting, first, a request report position message, and second, a second position signal having a second predetermined axis address;

a message generator communicating with the asynchronous link transceiver and the message decoder for periodically transmitting the first position signal on the asynchronous link indicating the motion of the motor shaft in response to the detected request report position message wherein the position signal transmitted by the message generator includes the first predetermined axis address; and a control means responsive to the first position signal and to the second position signal detected by the decoder having the second predetermined axis address to generate the motor commands controlling the motion of the motor shaft, the control means having a local clock for time stamping axis position report messages received over the asynchronous link.

* * * * *